United States Patent Office 3,824,265
Patented July 16, 1974

3,824,265
PREPARATION OF TRIALKYL LEAD SALTS OF ALIPHATIC MONOCARBOXYLIC ACIDS
Richard D. Gorsich, Baton Rouge, La., assignor to Ethyl Corporation, New York, N.Y.
No Drawing. Filed Dec. 21, 1961, Ser. No. 161,293
Int. Cl. C01f 7/00
U.S. Cl. 260—436
10 Claims This invention relates to a novel and convenient process for the manufacture of trialkyllead salts of aliphatic acids.

The trialkyllead salts and methods for their preparation have been known and reported in the literature for many years. One well known method comprises mixing tetraethyllead with an organic acid in the presence of a catalyst, such as silica gel, in a water solution and heating the mixture at 90° C. for approximately one hour. The product is then recovered by evaporation and recrystallization from an organic solvent such as hexane. Another method of wide application consists of converting a tetraalkyllead into the trialkyllead chloride and thence to the trialkyllead hydroxide which on treatment with the appropriate aliphatic acid in aqueous solution yields the corresponding tetraalkylead salt. The product is then purified by evaporation and recrystallization from a liquid hydrocarbon. A variation of the above process, which is widely used, is to react the tetraalkyllead hydroxide with a sodium salt of an aliphatic acid. For excellent discussions of alkyllead salts and their preparation see "Organolead Compounds" by Leeper, Summers and Gilman, Vol. 54, No. 1, Chemical Reviews, February 1954, and "Organiolead Compounds, Part 1. Trialkyllead Salts Possessing Sternutatory Properties," by Saunders and Stacey, Journal of the Chemical Society, 1949, pages 919 et seq.

Several disadvantages are apparent in the methods now most widely used in the art which impede their commercial usefulness. For instance, the necessity of a catalyst, the use of relatively high temperatures and the need for long reaction times, characterize many of these known processes. Another impediment found in a great many methods is the difficutly encountered in the purification of the product which is often contaminated with the aliphatic acid and which in any event requires a recrystallization step.

It is therefore an object of the present invention to provide the art with a unique and economical method for the production of trialkyllead salts of aliphatic acids which substantially obviates the above-mentioned difficulties. The desired trialkyllead salt can be produced, according to the process of this invention, in high yields, at room temperatures, without the aid of a catalyst in a period of time which is almost instantaneous and in a form which is easily purified without a recrystallization step.

The aforementioned advantages are accomplished according to this invention by reacting a trialkyllead halide with a metal salt of an aliphatic monocarboxylic acid in an ether solution. The reaction is generally conducted at a temperature in the range of from about —20 to about 200° C. for a period oftime, rarely exceeding five minutes, sufficient to effect the desired reaction. The product is recovered in a very pure form by filtration and stripping off the ether solvent. Expected yields can be up to 80 percent. If the trialkyllead halide is not initially available, the same beneficial results can be achieved by preparing the trialkyllead halide from a tetraalkyllead in the same batch in which the trialkyllead salt will be synthesized. This in situ preparation is done by mixing tetraalkyllead and the ether solvent and adding thereto a hydrogen halide (e.g., HCl) or elemental halogen (e.g., Br₂) at a temperature low enough (e.g., —10 to 20° C.) so as to cleave only one of the alkyl groups from the tetraalkyllead and form the trialkyllead halide intermediate. Thereupon, the metal salt of the aliphatic monocarboxylic acid is caused to react therewith to obtain the corresponding trialkyllead salt.

The trialkyllead halides which may be used in this invention may be represented by the formula:

wherein R is an alkyl group having 1–20 carbon atoms and X is a halogen. Particularly effective are the trialkyllead bromides and chlorides especially those containing up to about 8 carbon atoms in each alkyl group. Illustrative examples of the trialkyllead halides which may be used pursuant to this invention include trimethyllead fluoride, trimethyllead chloride, trimethyllead bromide, trimethyllead iodide, triethyllead fluoride, triethyllead chloride, triethyllead bromide, tripropyllead fluoride, tripropyllead chloride, tripropyllead bromide, tripropyllead iodide, tributyllead fluoride, tributyllead iodide, triamyllead fluoride, triamyllead iodide, trihexyllead fluoride, trihexyllead chloride, trihexyllead bromide, trihexyllead iodide, triheptyllead fluoride, triheptyllead chloride, triheptyllead bromide, triheptyllead iodide, trioctyllead fluoride, trioctyllead chloride, trioctyllead bromide, trioctyllead iodide, tridecyllead fluoride, tridecyllead chloride, tridecyllead bromide, tridecyllead iodide, tridodecyllead fluoride, tridodecyllead chloride, tridodecyllead bromide, tridodecyllead iodide, tripentadecyllead fluoride, tripentadecyllead chloride, tripentadecyllead bromide, tripentadecyllead iodide, trioctadecyllead fluoride, trioctadecyllead chloride, trioctadecyllead bromide, trioctadecyllead iodide, trieicosyllead fluoride, trieicosyllead chloride, trieicosyllead bromide, trieicosyllead iodide, diethylmethyllead fluoride, diethylmethyllead chloride, diethylmethyllead bromide, diethylmethyllead iodide, methylethylpropyllead fluoride, methylethylpropyllead chloride, methylethylpropyllead bromide, methylethylpropyllead iodide, diamylhexyllead fluoride, diamylhexyllead chloride, diamylhexyllead bromide, diamylhexyllead iodide, methyloctyleiscosyllead fluoride, methyloctyleicosyllead chloride, methyloctayleicosyllead bromide, methyloctyleicosyllead iodide and the like. Exceptionally good results are obtained using tri-n-butyllead halides, triisobutyllead halides, tri-n-amyllead halides, and triisoamyllead halides and as pointed out above, this is particularly true of the bromides and chlorides. Hence especially preferred embodiments of this invention comprise the use of tri-n-butyllead chloride, tri-n-butyllead bromide, tri-n-amyllead chloride, tri-n-amyllead bromide, triisobutyllead chloride, triisobutyllead bromide, triisoamyllead chloride, and triisoamyllead bromide.

The metallic salts of the aliphatic monocarboxylic acids used in the process of this invention may be represented by the general formula

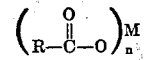

wherein R is hydrogen or an alkyl group containing 1 to about 20 carbon atoms, M is an atom of a reactive metal capable of forming salts with the foregoing acids, and $n$ is the valence of the metallic atom. Generally speaking, this metallic atom, M, is a Group I–A metal (lithium, sodium, potassium, rubidium, cesium), a Group II–A metal (beryllium, megnesium, calcium, strontium, barium), a Group III–A metal (aluminum, gallium, indium, thallium) or a Group I–B or Group II–B metal such as copper, silver, zinc, cadmium and mercury. From a cost effectiveness standpoint it is generally desirable to use the Group I–A or Group II–A metal salts of the aliphatic monocarboxylic acids, especially those which contain from 2 to about 6 carbon atoms in the molecule—i.e., the acetates, propionates, butyrates, valerates and caproates of the Group I-A and Group II-A metals. These particular metallic salts are easily formed from readily available starting materials and react smoothly and efficiently in the process of this invention. Examples of metal salts of saturated aliphatic monocarboxylic acids which may be used include lithium acetate, lithium isopropionate, lithium palmitate, sodium formate, sodium valerate, sodium acetate, sodium octadecate, potassium acetate, potassium propionate, potassium laurate, beryllium acetate, beryllium butydrate, beryllium caproate, magnesium acetate, magnesium formate, magnesium propionate, magnesium heptoate, cadmium acetate, cadmium valerate, strontium caproate, strontium eicosanate, barium formate, barium caproate, aluminum acetate, aluminum propionate, aluminum caproate, gallium valerate, gallium dodecate, gallium heptadecate, indium aceate, indium butyrate, indium eicosanate, thallium acetate, thallium valerate, thallium caproate, thallium pentadecate, zinc acetate, zinc propionate, zinc isovalerate, zinc pentadecate, mercury formate, mercury butyrate, mercury palmitate, copper acetate, silver formate, silver heptadecate, and the like.

A particularly preferred class of metal salts of aliphatic monocarboxylic acids for use in this invention is the group of silver salts, especially the silver salts of the aliphatic monocarboxylic acids which contain from 2 to about 6 carbon atoms in the molecule. These silver salts possess the distinct advantages of having a very high rate of reaction in the present process and also greatly simplify the separation and recovery procedures used in isolating the products produced thereby. The optimum silver salt used in accordance with the process of this invention is silver acetate. Other preferred silver salts include silver propionate, silver butyrate, silver isobutyrate, silver valerate, silver caproate, and the like.

As pointed out above, ethers are used as the reaction medium for the process of this invention. Thus effective use can be made of such aliphatic ethers as diethyl ether, dibutyl ether, methyl ethyl ether, ethylene glycol dimethyl ether, ethylene glycol diethyl ether, diethylene glycol dimethyl ether, diethylene glycol diethyl ether, diethylene glycol dibutyl ether, diethylene glycol methyl ethyl ether, triethylene glycol dimethyl ether, tetraethylene glycol dimethyl ether, and the like. A preferred class of ethers for use in this invention is made up of tetrahydrofuran and ring alkyklated derivatives thereof, especially those in which the alkyl group(s) are lower alkyl groups containing from 1 to about 6 carbon atoms each. Tetrahydrofuran itself is an outstanding solvent for use in this invention and thus is particularly preferred. Other suitable alkylated derivatives of tetrahydrofuran include dimethyldihydrofuran, trimethylhydrofuran, tetramethylfuran, diethyldihydrofuran, tetraethylfuran, methylethyl dihydrofuran, dimethyldiethylfuran, propyltrihydrofuran, tetrapropylfuran, methylethylpropylhydrofuran, tetrabutylfuran, dibutyldihydrofuran, tripentyldihydrofuran, didecyldihydrofuran, pentadecyltrihydrofuran, eicosyltrihydrofuran, methylethylpropylbutylfuran, and the like.

The amount of solvent used does not appear to be critical and can be varied according to the physical properties of the particular reactants. Excellent results are obtained when the initial concentration of the trialkyllead halide in the solvent is from about 10 percent to about 60 percent by weight.

The process of this invention may be conducted at atmospheric pressure in an open vessel or at autogeneous pressures in a closed vessel carried out at temperatures in the range of from about −20° C. to about 200° C., however, excellent results are obtained in the range of from about 10° C. to about 100° C. In the interest of convenience and economy it is recommended that the reaction be carried out at room temperature, e.g., about 20° C. to about 25° C.

Upon completion of the reaction, which occurs almost instantaneously and in any event usually less than five minutes, the product can easily be purified by filtering out the solids and stripping off the solvent. It is unnecessary, though possible of course, to introduce a recrystallization step in the purification process which could be accomplished by the use of organic solvents such as pentane, hexane, petroleum ether and the like. In the interest of simplicity and economy, however, this step is not recommended. By the same token, longer reaction periods can be used (e.g., up to several hours or more) although generally speaking, there is not particular advantage in doing so.

The reactants can be and preferably are used in approximately stoichiometric amounts according to the equation

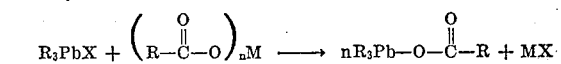

wherein R is an alkyl group containing 1–20 carbon atoms and $n$ is the valance of the metal atom, M. However, an excess of either reactant (e.g., up to about 50 percent over the theoretical stoichiometric amount) may be used, if desired. However, where the use of an excess is contemplated, it is generally desirable to use the metallic salt of the carboxylic acid in an excess of up to about 10 percent over the stoichiometric amount since this renders the purification steps much simpler.

In order that those skilled in the art may better understand the present invention the following examples are given.

EXAMPLE I

To 4.0 grams of tri-n-butyllead chloride in 15 ml. of tetrahydrofuran was added with stirring 1.8 grams of silver acetate. The reaction proceeded to completion at room temperature almost instantaneously. The solution was filtered and the solvent was stripped off to give 2.87 grams of tri-n-butyllead acetate, a colorless, odorless crystalline solid, m.p. 82–84° C., which corresponded to a 68 percent yield.

This example can be repeated using such reactants as trihexyllead chloride and silver propionate to form the corresponding trialkyllead salt (i.e., trihexyllead propionate).

EXAMPLE II

Twenty grams of tri-n-amyllead bromide was dissolved in 40 ml. of tetrahydrofuran. To this solution was added with stirring 8.4 grams of silver acetate. The reaction proceeded to completion at room temperature almost instantaneously. The solution was filtered and the solvent stripped off to give 11.4 grams of tri-n-amyllead acetate, a colorless, odorless crystalline solid. Therefore this product was formed in 58 percent yield.

This example can be repeated using other reactants such as trimethyllead bromide and sodium acetate to form trimethyllead acetate, triethyllead iodide and calcium butyrate to form triethyllead butyrate, and the like.

EXAMPLE III

Eleven grams of triisoamyllead bromide was dissolved in 35 ml. of tetrahydrofuran. To this solution was added with stirring 4.4 grams of silver acetate. The reaction proceeded to completion almost instantaneously. The solution was filtered and the solvent was stripped off to give 8.4 grams of a colorless, odorless crystalline solid, m.p. 145–146° C., which corresponded to an 80 percent yield of triisoamyllead acetate.

Repetition of this example using for instance trioctyllead bromide and in one instance potassium valerate, in another instance cesium caproate, and in a third instance aluminum propionate forms the corresponding trialkyllead salts, viz., trioctyllead valerate, trioctyllead caproate and trioctyllead propionate, respectively.

It will be clear that numerous variations of the process of this invention can be used, for instance; reacting lithium acetate and trimethyllead fluoride in diethyl ether to yield trimethyllead acetate, reacting beryllium propionate and triethyllead iodide in dibutyl ether to yield triethyllead propionate, reacting cadmium palmitate and tripropyllead chloride in methyl ethyl ether to yield tripropyllead palmitate, reacting gallium formate and tributyllead bromide in ethylene glycol dimethyl ether to yield tributyllead formate, reacting zinc valerate and triamyllead fluoride in ethylene glycol diethyl ether to yield triamyllead valerate, reacting rubidium octadecanoate and trihexyllead iodide in dioxane to yield trihexyllead octadecanoate, reacting magnesium laurate and triheptyllead chloride in 1,3-dioxane to yield triheptyllead laurate, reacting barium caproate and trioctyllead bromide in dibenzyl ether to yield trioctyllead caproate, reacting indium decanoate and tridecyllead fluoride in diethylene glycol dimethyl ether to yield tridecyllead decanoate, reacting thallium pentadecanoate and tridodecyllead iodide in tetramethylfuran to yield tridodecyllead pentadecanoate, reacting copper eicosanate and triheptadecyllead chloride in diethylene glycol dibutyl ether to yield triheptadecyllead eicosanate, reacting cadmium formate and trieicosyllead bromide in diethylene glycol methyl ethyl ether to yield trieicosyllead formate, reacting aluminum valerate and tripropyllead fluoride in methyl ethyl dihydrofuran to yield tripropyllead valerate, reacting cadmium propionate and triisopropyllead iodide in dimethyl diethylfuran to yield triisopropyllead propionate.

The literature contains many suggested commercial uses for organolead salts. For instance, studies have been made which show that trialkyllead acetates have a better stabilizing effect on polyvinyl chloride than inorganic lead and barium stabilizers. The biocidal properties of tetraalkyllead salts are well known as is indicated by the fact that these salts have been used as slimicides in wet aviation fuel, as fungicides and as insecticides. Trialkyllead salts have very effective vessicant and sternutatory properties which adapt them for use in military gases. Successful experimentation has been carried out to demonstrate the use of these salts for the inhibition of the growth of human tumor cells.

An interesting and very significant highlight of this invention is the production of the hitherto apparently unreported tri-n-amyllead acetate as described by Example II. The experimental work pertaining to the present invention revealed that tri-n-amyllead acetate has the unusual property of having uniquely high solubility in many common organic solvents. In fact, many attempts were made to crystallize this salt from different organic solvents such as hexane, pentane, benzene and the like and they were all unsuccessful. This is unusual in light of the fact that crystallization from an organic solvent is the standard method of purifying previously known trialkyllead salts. This abnormally high solubility in commercially available solvents renders tri-n-amyllead acetate extremely useful as a biocide in that the salt tends to remain in solution as the solvent evaporates even upon exposing an aerosol or spray to the atmosphere.

What I desire to claim and secure by Letters Patent of the United States is as follows:

1. A process for the production of trialkyllead salts of aliphatic monocarboxylic acids which comprises reacting a trialkyllead halide with a metal salt of an aliphatic monocarboxylic acid in an ether solvent; said trialkyllead halide being represented by the formula $$R_3PbX$$

wherein R is an alkyl group having 1–20 carbon atoms and X is a halogen, said metal salt being represented by the formula $$\left(R'-\overset{O}{\overset{\|}{C}}-O\right)_n M$$

wherein R′ is selected from the group consisting of hydrogen and an alkyl group containing 1–20 carbon atoms, M is an atom of a reactive metal capable of forming salts with aliphatic monocarboxylic acids, and $n$ is valence of the metallic atom and said ether solvent is selected from the group consisting of tetrahydrofuran and ring alkylated derivatives thereof wherein each alkyl group contains from 1 to about 6 carbon atoms.

2. The process of Claim 1 wherein said solvent is tetrahydrofuran.

3. The process of Claim 1 wherein the alkyl groups of said trialkyllead halide contain 1–8 carbon atoms.

4. The process of Claim 1 wherein said trialkyllead halide is tri-n-butyllead chloride.

5. The process of Claim 1 wherein said trialkyllead halide is tri-n-amyllead bromide.

6. The process of Claim 1 wherein trialkyllead halide is triisoamyllead bromide.

7. The process of Claim 1 wherein the metal atom of said salt of an aliphatic monocarboxylic acid is silver.

8. The process of Claim 1 wherein said metal salt is silver acetate.

9. The process of Claim 1 conducted at a temperature of from about 20° C. to about 25° C.

10. A process for the production of tri-n-amyllead acetate which comprises reacting a tri-n-amyllead halide with silver acetate in tetrahydrofuran at a temperature within the range of from about 20° C. to about 25° C.

References Cited

Saunders et al., *Journal of the Chemical Society,* 1949, pages 919–925.

McCombie et al., *Nature,* vol. 159, 1947, pages 491–494.

LELAND A. SEBASTIAN, Primary Examiner

U.S. Cl. X.R.

44—69; 260—45.75 R, 414, 435; 252—1; 424—293